(12) United States Patent
Chen et al.

(10) Patent No.: US 8,724,050 B2
(45) Date of Patent: May 13, 2014

(54) LCD MODULE MANUFACTURING METHOD AND LCD MODULE

(75) Inventors: Shih hsiang Chen, Shenzhen (CN); Jiahe Cheng, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 146 days.

(21) Appl. No.: 13/376,652

(22) PCT Filed: Dec. 3, 2011

(86) PCT No.: PCT/CN2011/083425
§ 371 (c)(1),
(2), (4) Date: Dec. 7, 2011

(87) PCT Pub. No.: WO2013/078694
PCT Pub. Date: Jun. 6, 2013

(65) Prior Publication Data
US 2013/0135555 A1 May 30, 2013

(30) Foreign Application Priority Data
Nov. 29, 2011 (CN) .......................... 2011 1 0386592

(51) Int. Cl.
*G02F 1/1333* (2006.01)
(52) U.S. Cl.
USPC ............................................. 349/60; 349/58
(58) Field of Classification Search
CPC .............................. G02F 1/1333; G02F 1/1335
USPC ....................................................... 349/58, 60
See application file for complete search history.

(56) References Cited

U.S. PATENT DOCUMENTS

| 4,020,627 | A * | 5/1977 | Yoshida et al. ................. 368/84 |
| 2001/0005416 | A1* | 6/2001 | Nakamichi ..................... 381/87 |
| 2003/0054722 | A1 | 3/2003 | Hung et al. |
| 2005/0062899 | A1 | 3/2005 | Fukayama et al. |
| 2006/0072051 | A1* | 4/2006 | Kang et al. ....................... 349/58 |
| 2007/0200969 | A1* | 8/2007 | Hsu et al. ......................... 349/58 |
| 2009/0059461 | A1* | 3/2009 | Yonekura et al. ............. 361/234 |

FOREIGN PATENT DOCUMENTS

| CN | 101004503 A | 7/2007 |
| CN | 101060016 A | 10/2007 |
| CN | 101515085 A | 8/2009 |
| CN | 201926843 U | 8/2011 |
| CN | 101813837 A | 9/2012 |

(Continued)

OTHER PUBLICATIONS

Machine translation of Maeda Konichiro JP 11-353116. Dec. 24, 1999.*
Abstract of Wan Y CN 1396223. Feb. 12, 2003.*

(Continued)

*Primary Examiner* — Lucy Chien
(74) *Attorney, Agent, or Firm* — IPro, Inc.; Na Xu

(57) ABSTRACT

The present invention discloses an LCD module manufacturing method and an LCD module. The LCD module manufacturing method comprises: arranging a groove for fixing the buffer strip in the surface position of the rubber frame of the LCD module for supporting the LCD panel. In the present invention, because the corresponding position of the rubber frame for supporting the LCD panel is provided with a groove, a region for limiting the position of the buffer rubber strip is formed by using the groove, the arranging position accuracy of the buffer rubber strip is increased, and the product quality is increased.

9 Claims, 3 Drawing Sheets

(56) References Cited

FOREIGN PATENT DOCUMENTS

| | | |
|---|---|---|
| JP | 9-22000 A | 1/1997 |
| JP | 10206828 A | 8/1998 |
| JP | 2000214457 A | 8/2000 |

OTHER PUBLICATIONS

Li Qingqing, the International Searching Authority written comments, Aug. 2012, CN.

Wang Zhenjia, the first office action, May 2013, CN.

* cited by examiner

LCD MODULE MANUFACTURING METHOD AND LCD MODULE

TECHNICAL FIELD

The present invention relates to field of liquid crystal displays (LCDs), and more particularly to an LCD module manufacturing method and an LCD module.

BACKGROUND

As a main part of an LCD device, an LCD module includes an LCD panel and a backlight module. At present, most LCD panels of the LCD panels in production are supported by the buffer rubber strips on rubber frames. As shown in FIG. 1, a manufacturer uses raw material rubber and an additive to conduct mixing, presses the mixed rubber into a strip, pastes a double sided adhesive tape on the rubber strip surface, attaches a buffer rubber strip 1 with double sided adhesive tape to a rubber frame 2, and assemblies LC (liquid crystal) glass and other components after assembling the rubber frame 2 on the backlight module. Furthermore, the accuracy that the buffer rubber strip 1 generally pasted by manual work is low and the buffer rubber strip 1 is often not correctly pasted, causing the product yield to be reduced.

SUMMARY

The aim of the present invention is to provide an LCD module manufacturing method and an LCD module with the advantages of high assembling accuracy, low production cost, and high production efficiency.

The purpose of the present invention is achieved by the following technical schemes. An LCD module manufacturing method comprises: A: Arranging a groove for fixing the buffer strip in the surface position of the rubber frame of the LCD module for supporting the LCD panel; and B: Fixing the buffer rubber strip in the groove.

Preferably, the step of fixing the buffer rubber strip in the groove comprises: B1: Filling a liquid adhesive in the groove; and B2: Solidifying the liquid adhesive to form an elastic buffer rubber strip.

The liquid adhesive is filled in the groove, a buffer rubber strip with an elastic solid structure is formed after the liquid adhesive is solidified, and then the buffer rubber strip plays the role of supporting and buffering the LCD panel. Because the liquid adhesive is limited by the groove in the liquid adhesive filling process, the liquid adhesive will not overflow outside the groove under the action of the liquid adhesive tension, the shape of the solidified liquid adhesive is consistent with the shape of the groove, and then a buffer rubber strip with preferable shape and high position accuracy is formed. Thus, the deviation caused by artificial rubberizing is avoided, the product quality is increased, the processes of additionally making buffer rubber strip and adding double sided adhesive tape are omitted, and the production efficiency is increased.

Preferably, in the step B1, the liquid adhesive is filled in the groove by an adhesive dispenser. By filling the liquid adhesive in the groove by the adhesive dispenser, the manual work is omitted, the production cost is saved, the production efficiency and the machining accuracy are increased because the filling speed and accuracy of the adhesive dispenser are higher than those of manual work, and then the product quality is increased.

Preferably, the liquid adhesive in the step B1 contains a paste additive, and the liquid adhesive solidified is bonded to the surface of the groove. Because a given amount of paste additive is added into the liquid adhesive, the liquid adhesive solidified is bonded to the surface of the groove, the deviation of the buffer rubber strip in the LCD module, causing buffer effect weakening or buffer failure, is avoided, and the technology of pasting double sided adhesive tape on the buffer rubber strip is omitted.

Preferably, the liquid adhesive in the step B1 contains a solidification additive so as to accelerate liquid adhesive solidification and increase production efficiency.

Preferably, in the step A, the step of arranging the groove is accomplished in the molding process of the rubber frame. Because the groove is formed in the molding process of the rubber frame, the later grooving technology is avoided, and the production cost is saved.

An LCD module comprises an LCD panel, a rubber frame for supporting the LCD panel, and a buffer rubber strip which is arranged between the rubber frame and the LCD panel and is used for buffering and supporting the LCD panel; the rubber frame is provided with a groove for arranging the buffer rubber strip.

Preferably, the section of the groove is rectangle in shape. The rectangular groove can be conveniently formed, and can contain more liquid adhesive.

Preferably, the section of the groove is trapezoid in shape. The trapezoidal groove enables the solidified liquid adhesive to form a buffer rubber strip whose bottom is trapezoid in shape as well. Thus, the buffer rubber strip is limited by the trapezoid and is fixed in the groove.

In the present invention, because the corresponding position of the rubber frame for supporting the LCD panel is provided with a groove, a region for limiting the position of the buffer rubber strip is formed by using the groove, the arranging position accuracy of the buffer rubber strip is increased so that the buffer rubber strip can provide reliable buffer support, and the product quality is increased.

Wherein: 1. buffer rubber strip; 2. rubber frame; 3. backlight module; 4. LCD panel; 5. adhesive dispenser; 11. liquid adhesive; 21. groove.

DETAILED DESCRIPTION

The present invention will further be described in detail in accordance with the figures and the preferred examples.

The LCD module manufacturing method of the present invention comprises the process of assembling the LCD panel and the backlight module, and the process mainly comprises the following steps: assembling the rubber frame and other components to form a backlight module; filling a liquid adhesive on the rubber frame provided with a groove; forming an elastic buffer rubber strip after the liquid adhesive is solidified; and assembling the LCD panel and the backlight module. Because the present invention is provided with a groove in the rubber frame, and a liquid adhesive is filled in the groove, a buffer rubber strip with an elastic solid structure is formed after the liquid adhesive is solidified, and then the buffer rubber strip plays the role of supporting and buffering the LCD panel. Because the liquid adhesive is limited by the groove in the liquid adhesive filling process, the liquid adhesive will not overflow outside the groove under the action of the liquid adhesive tension, the shape of the solidified liquid adhesive is consistent with the shape of the groove, and then a buffer rubber strip with preferable shape is formed. Thus, the deviation caused by artificial rubberizing is avoided, the position accuracy of the buffer rubber strip is increased, and the product quality is increased. In addition, the adhesive filling mode can be conveniently accomplished by machinery because of preferable generality, so that the operation efficiency is increased, and the production efficiency is increased.

Figure 1:
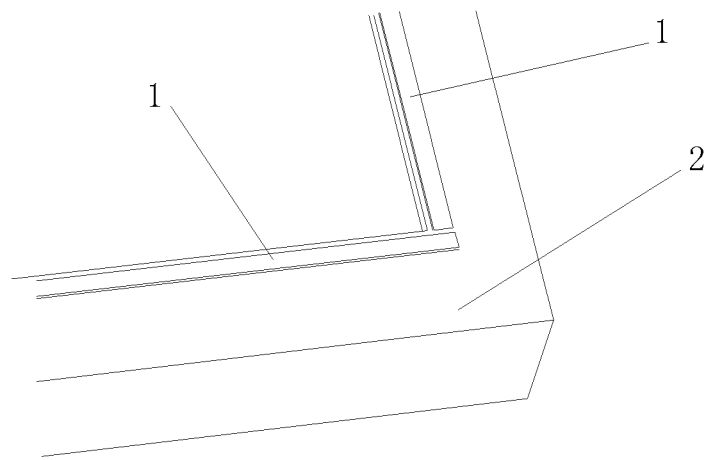
FIG. 1 is a schematic diagram of a buffer rubber strip on a rubber frame of an existing LCD module.
Figure 2:
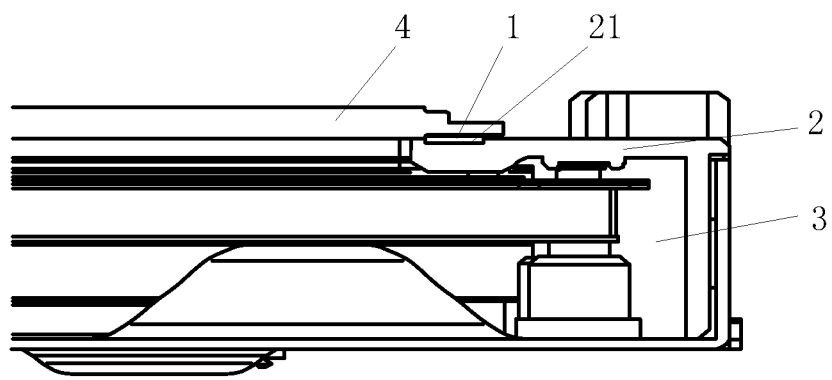
FIG. 2 is a simplified structure diagram of an LCD module of example 1 of the present invention.
Figure 3:
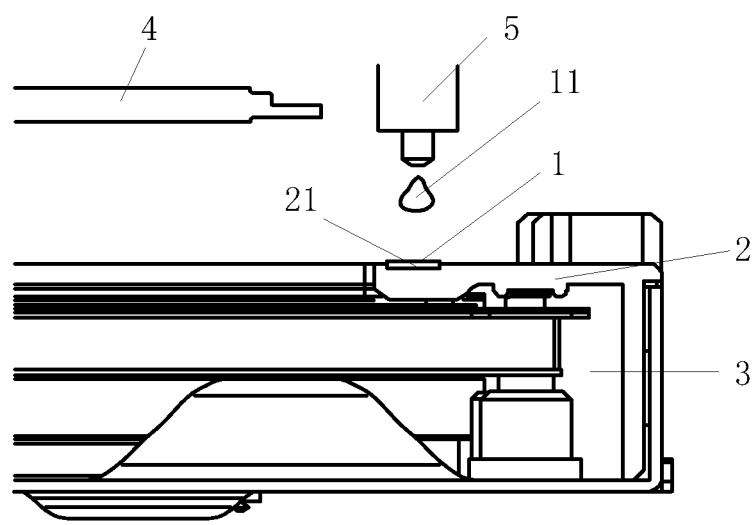
FIG. 3 is a first example of the present invention.

FIG. 2 and FIG. 3 show the first example of the present invention. An LCD module comprises a backlight module 3, a rubber frame 2 arranged on the periphery of the backlight module, and an LCD panel 4. In the figure, the surface of the rubber frame 2 corresponding to the loading position of the LCD panel 4 is provided with a rectangular groove 21, and a buffer rubber strip 1 whose bottom shape is corresponding to the shape of the groove 21 is arranged in the groove 21. Wherein, as shown in FIG. 3, the buffer rubber strip 1 is formed after the liquid adhesive 11 filled into the groove 21 by the adhesive dispenser 5 is solidified. The capacity of the groove 21 is less than the filling capacity of the liquid adhesive 11, but the liquid adhesive 11 will not leak under the action of tension. Of course, leakage will occur if excessive liquid adhesive 11 is filled because of insufficient tension support. Therefore, the height of the buffer rubber strip 1 which is formed after the liquid adhesive 11 is solidified is more than the depth of the groove 21, and then the buffer rubber strip 1 plays the role of buffering and supporting the LCD panel 4.

When assembling the LCD panel 4 and the backlight module 3, the rubber frame 2 and other components are assembled to form the backlight module 3; the liquid adhesive 11 is filled in the rectangular groove 21 of the rubber frame 2 by the adhesive dispenser 5; a buffer rubber strip 1 is formed after the liquid adhesive 11 is solidified, and then the LCD panel 4 and other components, and the backlight module 3 are assembled. By the mode of adhesive filling and solidification, the technology of processing and pasting buffer rubber strip is omitted, the processing time is shortened because of adhesive filling is accomplished by the adhesive dispenser, the batch production efficiency is increased, and the manual work cost is saved.

Figure 4:
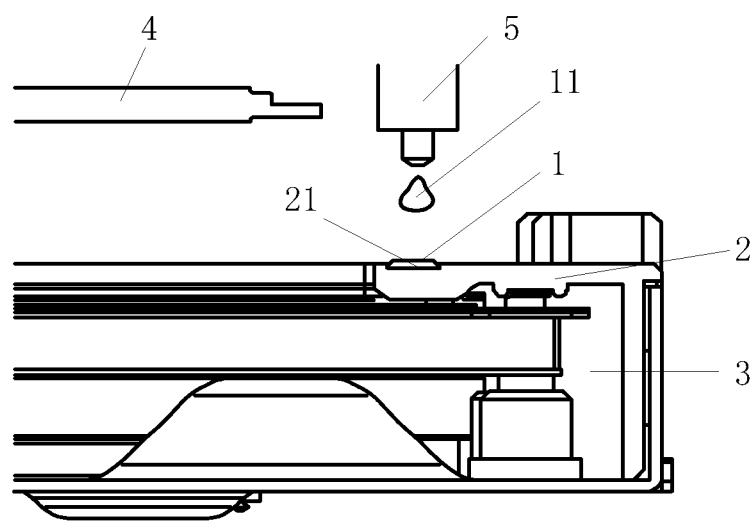
FIG. 4 is a second example of the present invention.
Figure 5:
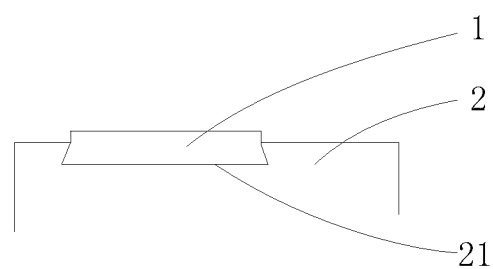
FIG. 5 is a partial enlarged view of the position of a groove of a second example of the present invention.

FIG. 4 and FIG. 5 show the second example of the present invention. The second example is different from the first example in that: the section of the groove 21 is trapezoid in shape. FIG. 5 is an enlarged view of the position of the groove of the present invention. As shown in the figure, the opening width of the groove 21 is less than the width of the bottom of the groove and is in trapezoid shape. The part of the solidified buffer rubber strip immersed in the groove 21 is also in trapezoid shape. Thus, the buffer rubber strip is limited by the opening width of the groove 21 because of large bottom volume, the buffer rubber strip is not easily disengaged from the groove 21, and the reliability of components is increased.

In the two examples of the present invention, the buffer rubber strip formed by the solidified liquid adhesive has certain elasticity, and achieves the function of buffering and supporting the LCD panel; in addition, paste additive and solidification additive are added into the liquid adhesive, the paste additive enables the buffer rubber strip formed by the solidified liquid adhesive to be bonded to the surface of the groove to increase the reliability of the buffer rubber strip, and the solidification additive accelerates the liquid adhesive solidification to increase the processing efficiency. Because the paste additive is used, the buffer rubber strip is not pasted with a layer of double sided adhesive tape, the technology step is reduced, and the productivity is increased.

In the two examples of the present invention, the groove is formed together with the rubber frame when the rubber frame is molded. Thus, the later grooving technology is avoided, and the production efficiency is increased. The liquid adhesive is filled by the adhesive dispenser, the speed is fast, and higher accuracy and accurate filling capacity can be achieved, so that the solidified liquid adhesive can form a uniform and flat shape, and the manual work is saved, the production cost is reduced, and the production efficiency is increased.

Under the conception of the present invention, the shape of the groove can be various, and is not limited to rectangle and trapezoid shapes of the two examples of the present invention. The groove mainly plays the role of providing a space for containing the liquid adhesive, so that the liquid adhesive can be solidified to form the buffer rubber strip.

The present invention is described in detail in accordance with the above contents with the specific preferred examples. However, this invention is not limited to the specific embodiments. For the ordinary technical personnel of the technical field of the present invention, on the premise of keeping the conception of the present invention, the technical personnel can also make simple deductions or replacements, and all of which should be considered to belong to the protection scope of the present invention.

We claim:

1. An LCD module manufacturing method, comprising:
   A: arranging a groove for fixing a buffer rubber strip in the surface position of a rubber frame of the LCD module for supporting an LCD panel, the groove being defined on an external top surface of the rubber frame; and
   B: fixing the buffer rubber strip in the groove, the buffer rubber strip being arranged below the LCD panel to be covered by the LCD panel; and
   wherein the section of said groove is trapezoid in shape, a surface of the buffer rubber strip contacting with the LCD panel being smaller than an opposite surface of the buffer rubber strip contacting with the rubber frame.

2. The LCD module manufacturing method of claim 1, wherein the step of fixing the buffer rubber strip in the groove comprises:
   B1: filling a liquid adhesive in the groove; and
   B2: solidifying the liquid adhesive to form an elastic buffer rubber strip.

3. The LCD module manufacturing method of claim 2, wherein in said step B1, the liquid adhesive is filled in said groove by an adhesive dispenser.

4. The LCD module manufacturing method of claim 2, wherein the liquid adhesive in said step B1 contains a paste additive, and said liquid adhesive solidified is bonded to the surface of said groove.

5. The LCD module manufacturing method of claim 2, wherein the liquid adhesive in said step B1 contains a solidification additive.

6. The LCD module manufacturing method of claim 1, wherein in said step A, the step of arranging the groove is achieved in the molding process of the rubber frame.

7. An LCD module, comprising: an LCD panel, a rubber frame for supporting the LCD panel, and a buffer rubber strip which is arranged between the rubber frame and the LCD panel and is used for buffering and supporting the LCD panel; the rubber frame is provided with a groove for arranging the buffer rubber strip, the groove is defined on an external top surface of the rubber frame, and the buffer rubber strip is arranged below the LCD panel to be covered by the LCD panel, wherein the section of said groove is trapezoid in shape, a surface of the buffer rubber strip contacting with the LCD panel being smaller than an opposite surface of the buffer rubber strip contacting with the rubber frame.

8. The LCD module of claim 7, wherein said buffer rubber strip is an elastic buffer rubber strip which is integrally and directly formed in said groove and is formed by the solidified liquid adhesive.

9. The LCD module of claim 7, wherein the section of said groove is rectangle in shape.

* * * * *